United States Patent [19]
Jones

[11] Patent Number: 4,721,336
[45] Date of Patent: Jan. 26, 1988

[54] FLEXIBLE CAP FOR A TRUCK BED

[75] Inventor: Hazel R. Jones, Mechanicsburg, Pa.

[73] Assignee: Flex-A-Cap, Arlington, Va.

[21] Appl. No.: 906,414

[22] Filed: Oct. 22, 1986

[51] Int. Cl.⁴ ............................................. B62D 25/06
[52] U.S. Cl. .................................. 296/100; 296/105; 135/103
[58] Field of Search ................. 296/105, 100; 135/103

[56] References Cited

U.S. PATENT DOCUMENTS

| | | | |
|---|---|---|---|
| 3,606,448 | 9/1971 | Walker | 296/105 |
| 3,773,380 | 11/1973 | Stockdill | 296/100 |
| 4,150,682 | 4/1979 | Ryce | 135/103 |
| 4,289,346 | 9/1981 | Bourgeois | 296/105 |

Primary Examiner—Robert R. Song
Attorney, Agent, or Firm—Griffin, Branigan, & Butler

[57] ABSTRACT

A flexible cap for a truck bed comprises a plurality of supports intermediately positioned along the truck bed, with a flexible material being stretched over the supports to form the cap. Braces between the supports may be folded into a collapsed position so as to permit the supports to be slid along guide tracks positioned along opposite sides of the truck bed. The supports may be slid into an abutting relationship so as to result in the cap being totally collapsed into a compact package in a forward part of the truck bed. If desired, the cap may be only partially collapsed so as to leave a portion of the truck bed exposed while a further portion of the bed is still sheltered.

19 Claims, 13 Drawing Figures

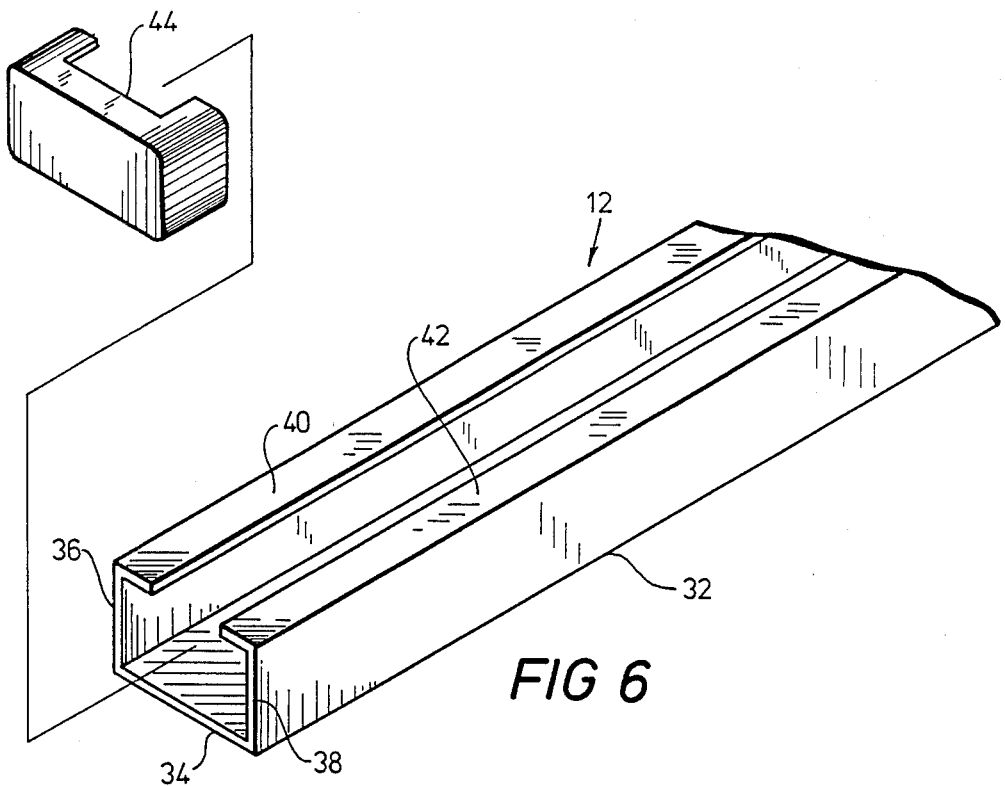
FIG 6
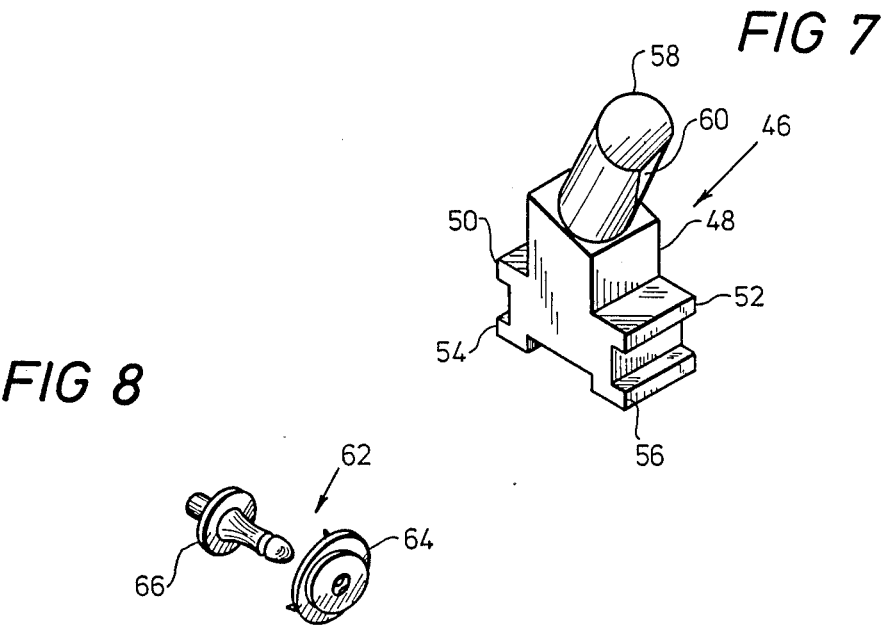
FIG 7
FIG 8

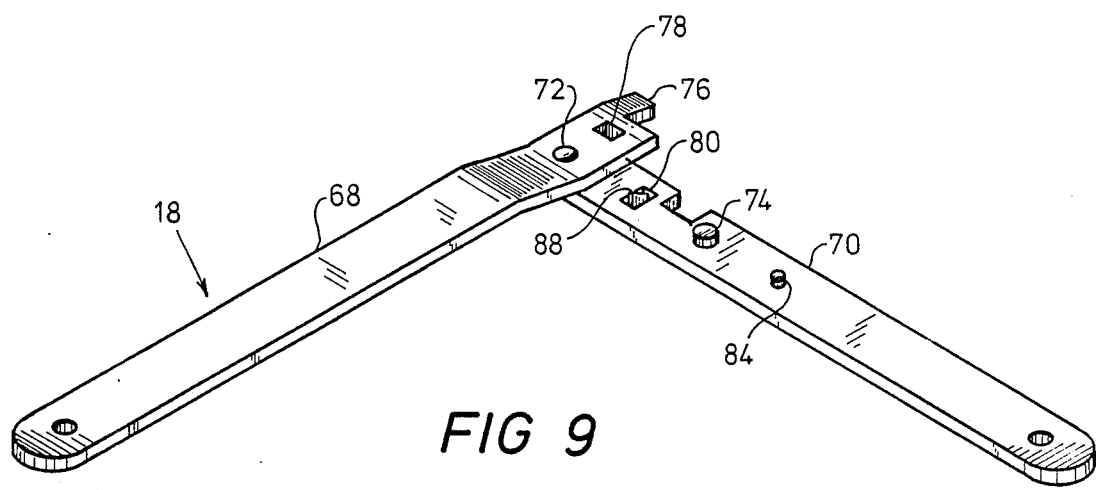
FIG 9
FIG 10
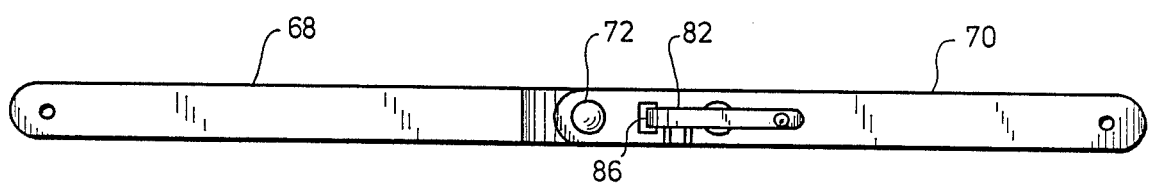
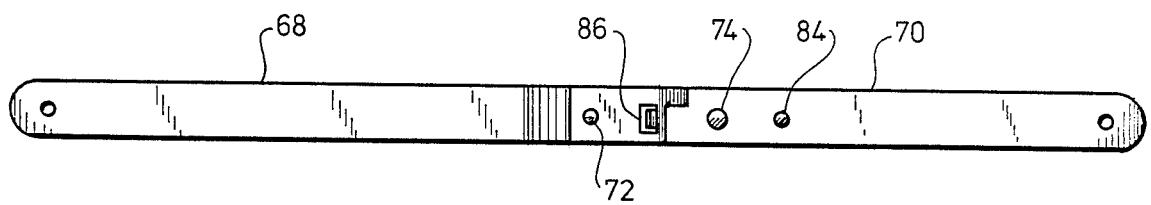
FIG 11

FLEXIBLE CAP FOR A TRUCK BED

BACKGROUND OF THE INVENTION

1. Field of the Invention

The present invention relates to truck bed caps, and more particularly pertains to a new and improved flexible, collapsible cap which may be permanently retained upon a truck bed and which may be extended into a working position in a rapid and efficient manner.

2. Description of the Prior Art

Caps and covers for the beds of pickup trucks and other similar vehicles are well known in the prior art. These covers and caps range from flexible materials, which are fixably securable across a truck bed, to very sophisticated and expensive camper tops which may include doors, windows, self-contained heating systems, etc. Of course, an appropriate rise in cost is evident as the degree of sophistication increases. In any event, there are most likely hundreds of different types of caps and covers for truck beds which are designed to accommodate the various desires of the purchasers.

A great majority of the truck covers sold today are of a simplistic rectangular design which is lightweight in construction and which preferably covers the entire truck bed. However, even the most lightweight commercially available cover requires at least the efforts of two men to remove the same from a truck bed. In this respect, it can be appreciated that there are occasions when a truck user needs to obtain access to the truck bed for hauling, with this hauling being impossible when the cover is in place. As such, the industry has relied upon the manufacture of the aforementioned lightweight covers and caps whereby through the efforts of at least two men, access to the truck bed can be achieved.

Accordingly, those familiar with the art realize the continuing need for new and improved truck bed caps and covers which can be easily installed and which can be easily removed when necessary so as to afford access to the associated truck bed. In this respect, the present invention substantially fulfills this need.

SUMMARY OF THE INVENTION

In view of the foregoing disadvantages inherent in the known types of truck bed caps and covers now present in the prior art, the present invention provides an improved truck bed cover which is designed to be permanently retained on a truck bed and which may be collapsed in an accordion-like fashion to facilitate access to the truck bed when desired. As such, the general purpose of the present invention, which will be described subsequently in greater detail, is to provide a new and improved truck bed cover which has all the advantages of the prior art truck bed caps and covers, and none of the disadvantages.

To attain this, the present invention provides for a truck bed covering assembly which includes a plurality of upstanding cover supports slidably movable within guide tracks fixedly secured on opposed sides of the truck bed. The cover supports may be secured in a spaced-apart relationship by collapsible, lockable braces, with a flexible covering material then being stretched over the supports. When desired, the collapsible braces may be folded to facilitate a sliding movement of the individual cover supports forwardly on the truck bed until they are all in a close abutting relationship next to the truck cab, thereby providing access to the truck bed per se. After a use of the exposed bed, the covering assembly can be slid outwardly again over the guide tracks, with the support braces then being locked into position to retain the cover over the truck bed. The design of the invention also permits a partial collapsing of the covering assembly when desired, whereby a portion of the truck bed may remain covered while a remaining portion is exposed for access.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions so as far as they do not depart from the spirit and scope of the present invention.

It is therefore an object of the present invention to provide a new and improved truck bed cover which has all the advantages of the prior art truck bed covers and caps, and none of the disadvantages.

It is another object of the present invention to provide a new and improved truck bed cover which may be easily and efficiently manufactured and marketed.

It is a further object of the present invention to provide a new and improved truck bed cover which is of a durable and reliable construction, and which may be easily moved into and out of an operating position.

Still another object of the present invention is to provide a new and improved truck bed cover which is adaptable for use on any exposed truck bed.

Yet another object of the present invention is to provide a new and improved truck bed cover which is characterized by a lightweight construction, thereby to facilitate the installation and use thereof.

An even further object of the present invention is to provide a new and improved truck bed cover which is susceptible of a low cost to manufacture with regard to both materials and labor, and which accordingly is then susceptible of low prices of sale to the consuming public, thereby making such covers economically available to the buying public.

Still yet another object of the present invention is to provide a new and improved truck bed cover which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description. Such description makes reference to the annexed drawings wherein:

FIG. 6 is a partial perspective view of the guide track assembly forming a part of the present invention.

FIG. 7 is a perspective view of a slide member forming a part of the present invention.

FIG. 8 is a perspective view of a preferred fastener arrangement utilizable with the invention.

FIG. 9 is a perspective view of a support brace utilizable in the construction of the invention.

FIG. 10 is a top plan view of the brace.

FIG. 11 is a bottom plan view of the brace.

DESCRIPTION OF THE PREFERRED EMBODIMENT

Figure 1:
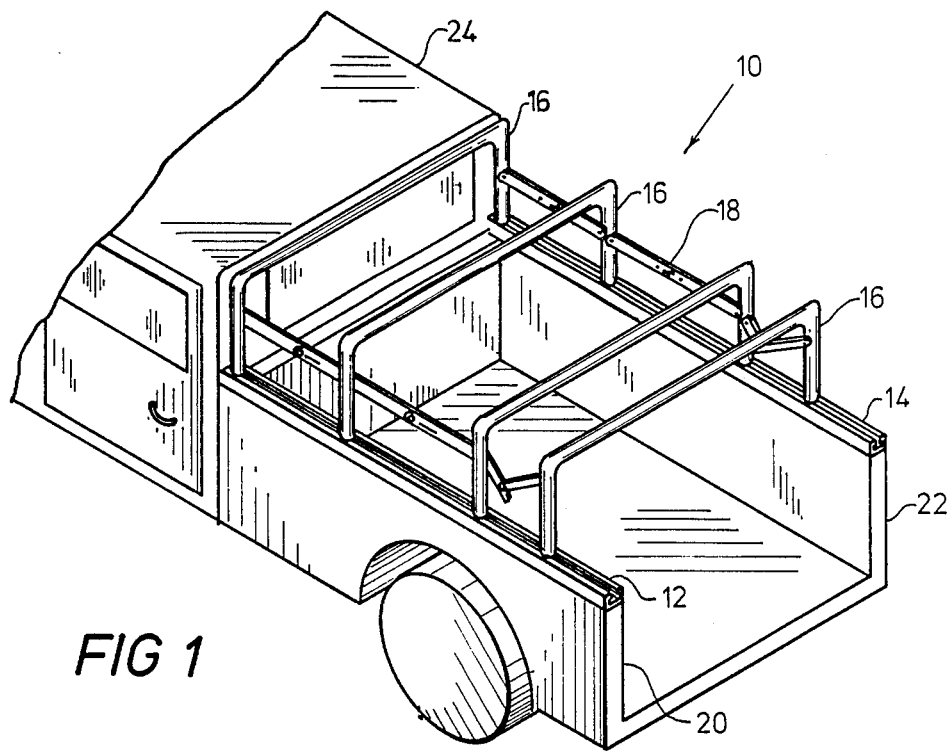
FIG. 1 is a perspective view of the truck bed cover support assembly comprising the present invention with the flexible cover thereof removed and with the support assembly operably installed on a truck bed.

With reference now to the drawings, and in particular to FIG. 1 thereof, a new and improved flexible, collapsible truck bed cover embodying the principles and concepts of the present invention and generally designated by the reference numeral 10 will be described.

More specifically, FIG. 1 shows the cover assembly 10 having its flexible covering portion removed whereby the assembly can be seen to comprise a pair of guide tracks 12, 14 into which are slidably positioned a plurality of U-shaped cover supports 16. The cover supports 16 may vary in number depending upon the size of the truck bed being covered, and they may be selectively spaced apart through the use of collapsible, lockable braces 18 as will be subsequently described. Of course, the guide tracks 12, 14 are respectively fixedly secured to topmost sections of sidewalls 20, 22 forming a part of a truck bed associated with a truck 24. The guide tracks 12, 14, which will also be subsequently described in greater detail, may be fixedly secured to the respective sidewalls 20, 22 by any conventional means, preferably through the use of threaded fasteners of the like.

Figure 2:
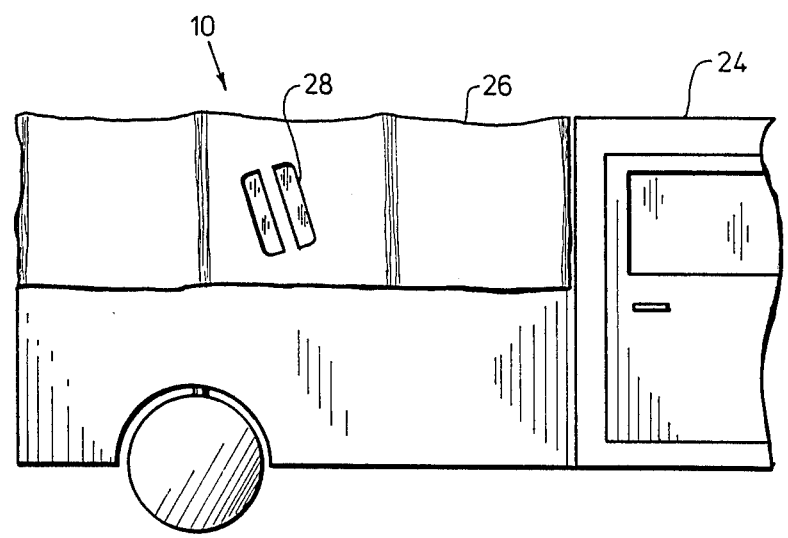
FIG. 2 is a side elevation view of the cover in a fully extended position on a truck bed.

FIG. 2 of the drawings illustrates the truck bed cover assembly 10 in a fully extended position over the truck 24, and further illustrates the use of a flexible cover 26 which is connected to each of the cover supports 16. If desired, the cover 26, which could be formed from canvas, plastic, or some other functional flexible material, may include flexible side windows 28. FIG. 2 further illustrates the fact that the truck bed cover assembly 10 can be extended in an accordion-like manner along the guide tracks 12, 14 to accommodate the full length of a truck bed.

Figure 3:
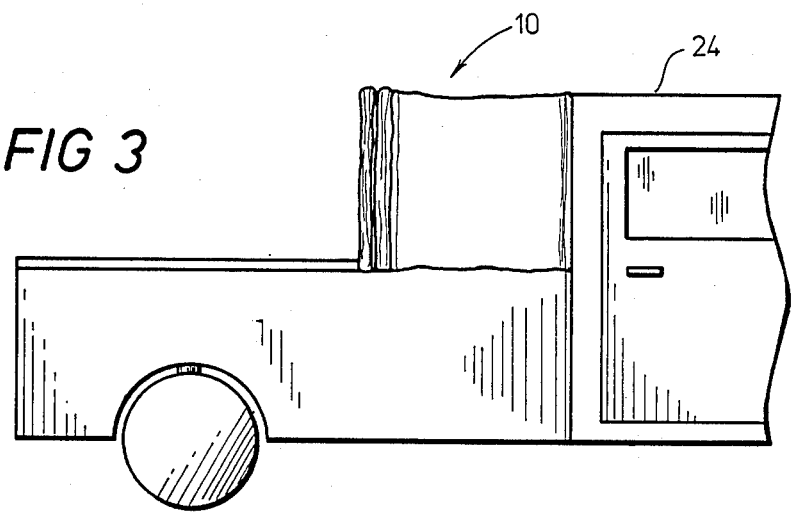
FIG. 3 is a side elevation view of the cover showing the same partially collapsed.
Figure 4:
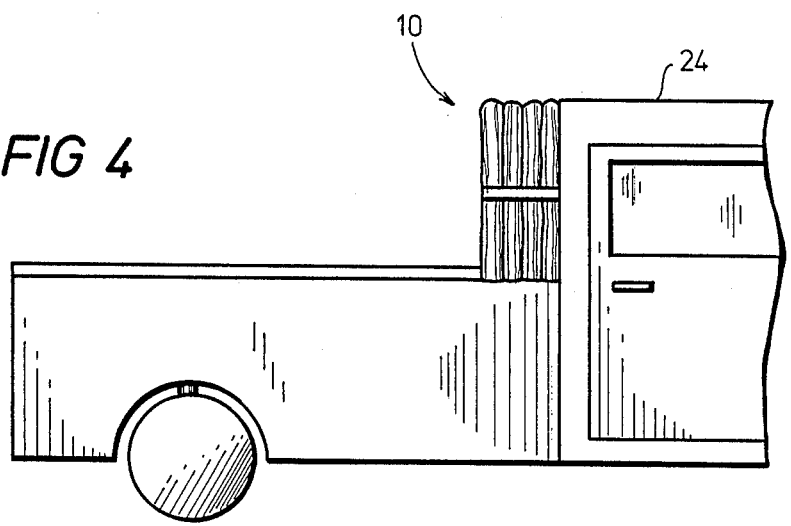
FIG. 4 is a side elevation view of the cover showing the same totally collapsed.
Figure 5:
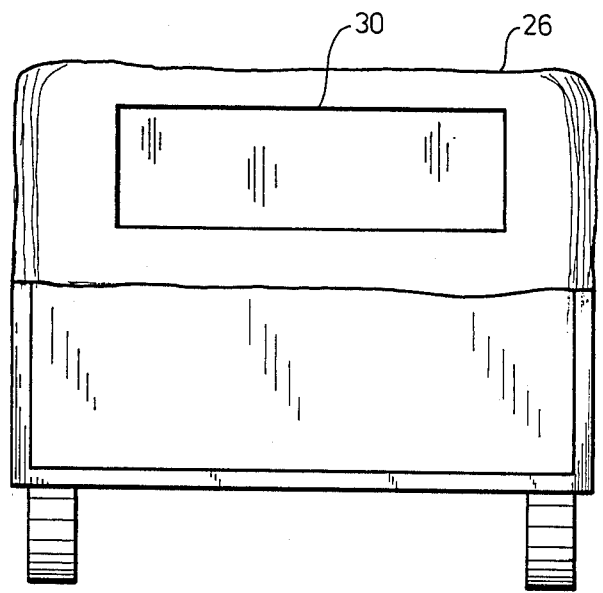
FIG. 5 is a rear elevation view of the cover on a truck bed.

FIGS. 3 and 4 further illustrate the versatility of the truck bed cover 10 comprising the present invention. More particularly, FIG. 3 shows the cover assembly 10 partially collapsed upon the truck bed, whereby a portion of the truck bed is open for use, while the remaining portion of the bed is appropriately covered as desired. FIG. 4 illustrates a complete collapsing of the cover 10 upon the truck bed, whereby the cover assembly is compactly stored until a further use thereof is required. FIG. 5, which illustrates an end view of the truck bed cover assembly 10, has been provided to illustrate a further use of a flexible window 30 operably installed in the cover 26 whereby in this embodiment of the invention, it is envisioned that the cover assembly would be utilized as a camper top.

FIG. 6 of the drawings illustrates the simplistic and thus economical design of guide tracks 12, 14 utilized in the combination of the present invention. Inasmuch as the guide tracks 12, 14 are identical in construction and design, only a description of the guide track 12 will be provided. In this regard, it can be seen that the guide track 12 essentially consists of a U-shaped channel 32 having its open portion facing upwardly, while a bottom surface 34 thereof is fixedly securable to the truck sidewall 20. The channel sidewalls 36, 38 are provided with respective inwardly extending lips 40, 42, with all of the wall portions 34, 36, 38, 40, 42 being substantially orthogonally attached to the respective portions thereof to thus define a rectangularly-shaped channel. And end cap 44 is positionable over an end of the guide track 12 once the same has been operably installed on the sidewall 20, with a similar end cap being positionable over the guide track 14 which is operably installed on the sidewall 22.

FIG. 7 illustrates the design of a slide member 46 which is positionable within the rectangular channels of the guide tracks 12, 14. Referencing the use of the slide member 46 only with respect to the guide track 12, it will be noted that the member includes a body portion 48 having intermediately positioned outwardly extending tangs 50, 52 and bottommost positioned outwardly extending tangs 54, 56. When the slide member 46 is positioned within the rectangularly-shaped channel of the guide track 12, the tangs 54, 56 slidably engage the bottom wall 34 of the guide track, as well as the interior surfaces of the respective sidewalls 36, 38. Similarly, the tangs 50, 52 slidably engage the respective sidewalls 36, 38 of the guide track 12, as well as the respective bottom surfaces of the walls 40, 42. Thus, the tangs 50, 52, 54, 56 serve to retain the slide member 46 in a stable operable position within the guide track 12, while also permitting a slidable movement thereof within the track. Additionally, it will be noted that the slide member 46 includes an upwardly extending, angulated cylindrically-shaped member 58 which is engageable within a hollow end portion of one of the cover supports 16. A beveled surface 60 is provided on the member 58 to facilitate its insertion within the hollow end of a support 16, while the member 58 may then be frictionally or otherwise fixedly secured within the member by some conventional means. As such, the slide member 46 serves as the means by which a cover support 16 is fixedly, slidably secured to the respective guide tracks 12, 14. The slide member 46 may be manufactured from any known material which would function in the desired manner, with a preferred embodiment of the invention having the slide member integrally molded from a thermoplastic or rubber material.

FIG. 8 of the drawings illustrates a fastener 62 which is of a conventional design and which is illustrative of a type that could be used to fasten the cover 26 to the individual supports 16. Preferably, the cover 26 could be snap fitted directly to the cover supports 16 or alternatively, pockets could be sewn in the cover whereby the pockets extend around the supports to be snap fitted on respective sides thereof. The conventional fastener 62, which includes a socket 64 and a single eyelet type stud 66 fastenable thereto, is only illustrative of the many types of different fasteners which can be used to accomplish the purposes of the present invention. Accordingly, it is within the intent and purview of the present invention to encompass all known types of fasteners which would accomplish the desired result.

FIGS. 9, 10 and 11 illustrate the aforementioned collapsible brace 18, with two such braces extending between each pair of cover supports 16. As illustrated, each collapsible brace 18 includes a pair of longitudinal arms 68, 70 which are pivotally interconnected at an intermediate point 72. The arm 70 includes an upstanding stop member 74 which is abuttable with an integral outwardly extending tang 76 forming a part of the arm 68. As such, pivotable movement of the arms 68, 70 is permitted only in one direction inasmuch as the abutment of the members 74, 76 preclude pivotable movement in the opposed direction.

Further illustrated in FIG. 9 is a through-extending rectangularly-shaped aperture 78 in the arm 68, with this aperture being alignable with a similar through-extending, rectangularly-shaped aperture 80 formed in the arm 70. The apertures 78, 80 are aligned when the arms 68, 70 are axially aligned as illustrated in FIGS. 10 and 11. A spring locking member 82 is fixedly secured to the arm 70 by a conventional fastening means 84, such as a pin, threaded fastener, rivet or the like, and includes a forwardly bent portion 86 which is positionable through the aligned apertures 78, 80 in the manner best illustrated in FIGS. 10 and 11. When the bent end 86 of the spring 82 is positioned within the apertures 78, 80, it serves as a locking means to prevent pivotable movement of the arms 68, 70 out of axial alignment. Thus, with the locking spring 82 in position, the arms 68, 70 are lockably aligned whereby the brace 18 serves to hold a pair of cover supports 16 in a fixed spaced-apart relationship. When it is desired to collapse the cover assembly then, it becomes necessary to pivot the brace arms 68, 70 about the pivot point 72, and this is accomplished by a manual depressing of the bent end 86, whereby the end no longer extends into the aperture 78, thus permitting relative pivotable movement between the arms 68, 70. A user need only to use his finger to push the end 86 out of the aperture 78 to accomplish the desired collapsing of the brace 18. An automatic locking function is achieved when the arms 68, 70 are aligned inasmuch as the end 86 is formed with a angulated cam surface 88, as best illustrated in FIG. 9, whereby the arm 68 slides up and over the surface 88 to initially move the end 86 out of the way to facilitate the alignment of the arms 68, 70. When the aperture 78 comes into alignment with the aperture 80, the spring biasing effect of the member 82 will effect a movement of the end 86 into the aperture 78, thereby to accomplish the desired automatic locking of the arms 68, 70 in an axially aligned position.

Figure 12:
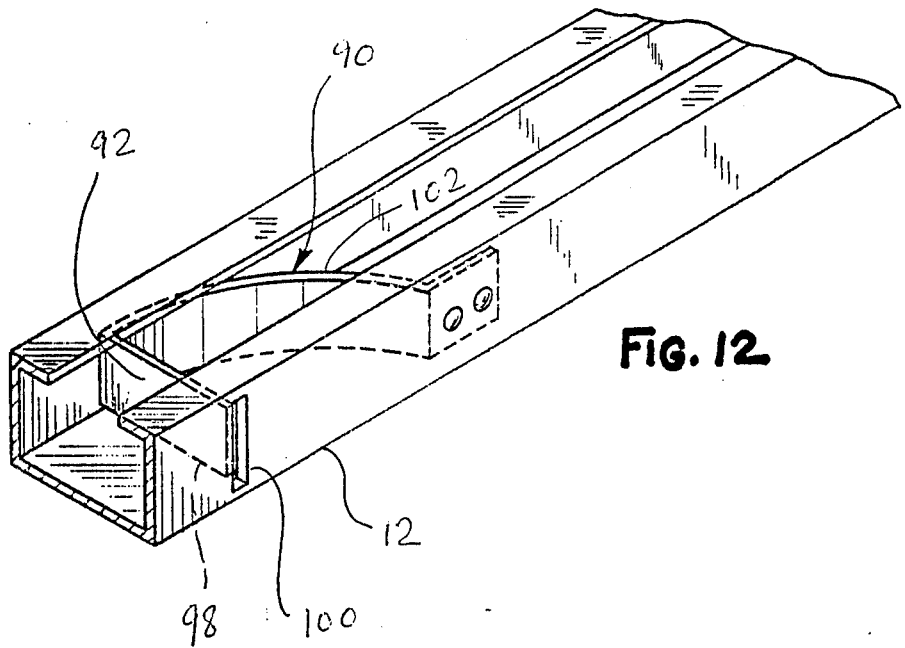
FIG. 12 is a cross-sectional perspective view of the locking mechanism utilized to hold the slide member in the guide track.
Figure 13:
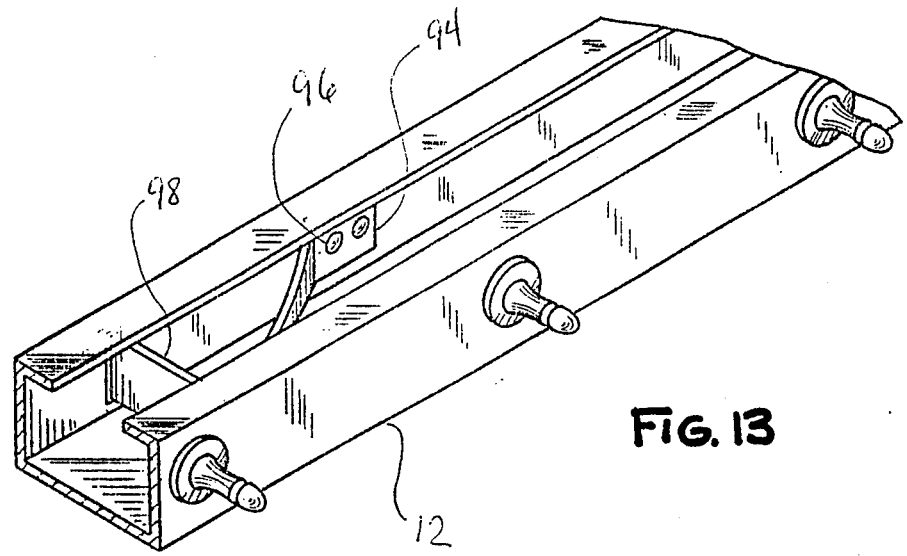
FIG. 13 is an opposed cross-sectional perspective view of the locking mechanism.

FIGS. 12 and 13 of the drawings illustrate a locking mechanism which may be utilized to retain a slide member 46 within a desired location along one of the guide tracks 12, 14, with such locking mechanism being generally designated by the reference numeral 90. Any number of these locking mechanisms 90 may be utilized in the respective guide tracks 12, 14, and such mechanisms essentially comprise flexible metallic U-shaped spring members 92 fixedly secured within the tracks. A first end 94 of a spring member 92 is fixedly secured to an interior wall surface of a track 12, 14 by some conventional means, such as through the use of rivets 96, with the remaining free end 98 being alignable with a through-extending aperture 100 formed in a track sidewall. A slide member 46 may be moved within the tracks 12, 14 into abutment with a cammed portion 102 of a spring member 92 to thus effect a flexible displacement of the spring member by the extension of the end 98 outwardly from the track through the aperture 100. Once the slide member 46 has passed by the spring member 92, it will flexibly return into the interior channel of the track member 12, 14, thereby to prevent a reverse slidable movement of the slide member 46 therein. A manual depression of the spring member 92 is required to move the locking mechanism out of position to thus permit a return disengaging movement of the slide member 46 through the channel 12, 14.

With respect to the manner of operation and usage of the present invention, it can be seen that the truck bed assembly 10 may be permanently installed on a truck bed simply by the installation of the guide tracks 12, 14 in the manner aforedescribed. A full extension of the cover assembly 10 is achieved by the axial extension of the plurality of collapsible braces 18, whereby the cover supports 16 are retained in a space-apart relationship. A partial uncovering of the truck bed may be accomplished by a collapsing of the braces 18 located at a rear portion of the truck bed, thereby to achieve a partial collapsing of the cover assembly 10 as best illustrated in FIG. 3. When access is desired to the complete truck bed, all of the braces 18 may be collapsed, whereby the cover support 16 can be slide in the guide tracks 12, 14 to a forward position in the truck bed next to the truck cab, such as illustrated in FIG. 4. As such, the truck bed cover assembly 10 may be permanently installed on the truck bed and may be used to cover and uncover the bed as desired in a rapid and efficient manner.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as being illustrative only of the principles of the invention. Further, since numerous modifications and changes will readily occur to those skilled in the state of the art, it is not desired to limit the invention to the exact construction and operation shown and described, and accordingly, all suitable modifications and equivalents may be resorted to, falling within the scope of the invention.

What is being claimed as being new and desired to be protected by Letters Patent of the United States is as follows:

1. A new and improved truck bed cover comprising:

guide track means fixedly securable to side sections of said truck bed;

slide means slidably guidingly movable within said guide track means;

cover support means operably attached to said slide means; and, flexible cover means selectively attachable to said cover support means and, pivotable brace means having a plurality of pivot points interposed between spaced apart members forming said cover means, said pivot points all being in axial alignment.

2. A new and improved truck bed cover as described in claim 1, wherein said brace means may be selectively collapsed to permit a movement of said cover support means relative to said guide track means.

3. A new and improved truck bed cover as described in claim 2, wherein said brace means include first and second arms pivotally attached together, said first and second arms being movable into an axially aligned position to establish a positioning of said members.

4. A new and improved truck bed cover as described in claim 3, and further including lock means for holding said first and second arms in said aligned position without allowing a pivotal motion between said first and second arms in any direction.

5. A new and improved truck bed cover as described in claim 4, and further including stop means for limiting an amount of movement of said first and second arms beyond said aligned position.

6. A new and improved truck bed cover as described in claim 4, wherein said lock means comprises a spring biased member selectively movable through first and second apertures respectively formed in said first and second arms.

7. A new and improved truck bed cover as described in claim 6, wherein said spring biased member includes a cam surface for facilitating its guided movement during an alignment of said first and second arms.

8. As new and improved truck bed cover as described in claim 2, wherein said guide track means comprises at least one inverted channel member having an open channel portion thereof positioned upwardly for receiving said slide means.

9. A new and improved truck bed cover as described in claim 8, wherein said channel member further includes inwardly extending lip sections, said lip sections serving to retain the slide means in slidable engagement with said guide track means.

10. A new and improved truck bed cover as described in claim 9, wherein said slide means includes outwardly extending tang means slidably engageable with interior surfaces of said channel member.

11. A new and improved truck bed cover as described in claim 1, wherein said cover support means includes a plurality of U-shaped support bars, each of said support bars having ends thereof attached to said slide means, whereby said support bars may slidingly move within said guide track means.

12. A new and improved truck bed cover as described in claim 11, and further including selectively collapsible brace means positionable between said support bars.

13. A new and improved track bed cover as described in claim 12, wherein said brace means are pivotally attached to said support bars and may be extended into a locked position whereby said support bars are in a maximum spaced-apart relationship, thereby to form said truck bed cover.

14. A new and improved truck bed cover as described in claim 13, and further wherein said brace means may be collapsed to permit a sliding together of said support bars in said guide track means into a folded and abutting relationship, thereby to define a collapsing and removing of said cover from said truck bed.

15. A new and improved truck bed cover as described in claim 14, wherein said brace means comprises a plurality of separate collapsible braces positioned between each of said support bars, whereby selected ones of said braces may be collapsed to permit only a partial removal and collapsing of said truck bed cover.

16. A new and improved truck bed cover as described in claim 15, wherein each of said braces comprises first and second arms pivotally attached together.

17. A new and improved truck bed cover as described in claim 16, wherein said first and second arms may be axially aligned into a locked position, thereby to define an extension of said brace means between said support bars.

18. A new and improved truck bed cover as described in claim 17, wherein said first and second arms include a manually releasable lock means for holding them in an axially aligned position.

19. A new and improved truck bed cover as described in claim 18, and further including stop means to limit an amount of pivotal movement between said first and second arms during an axial alignment thereof.

* * * * *